June 30, 1970     J. M. WHALEN     3,517,860
ICE DISPENSER HAVING POLYGONAL WALLS
Filed July 15, 1968
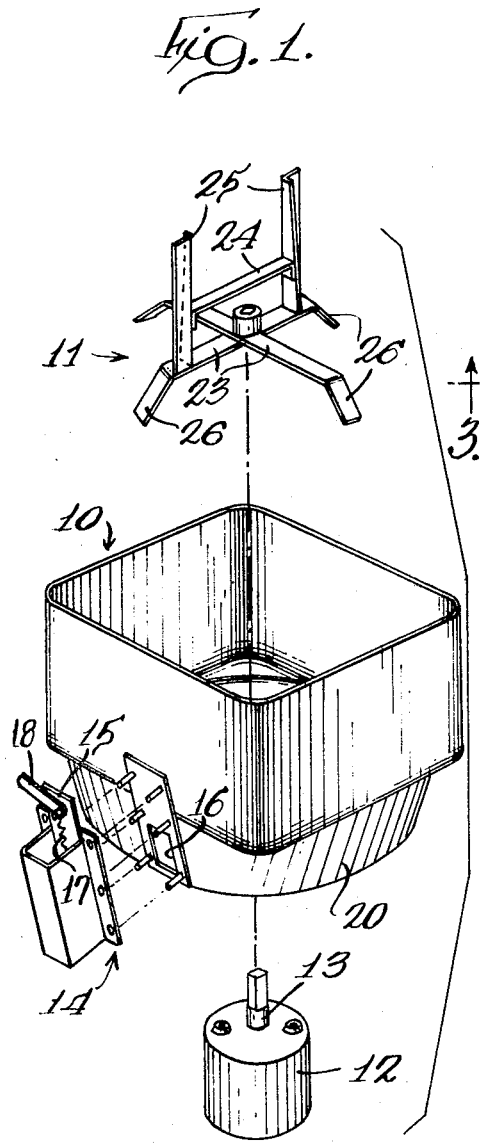
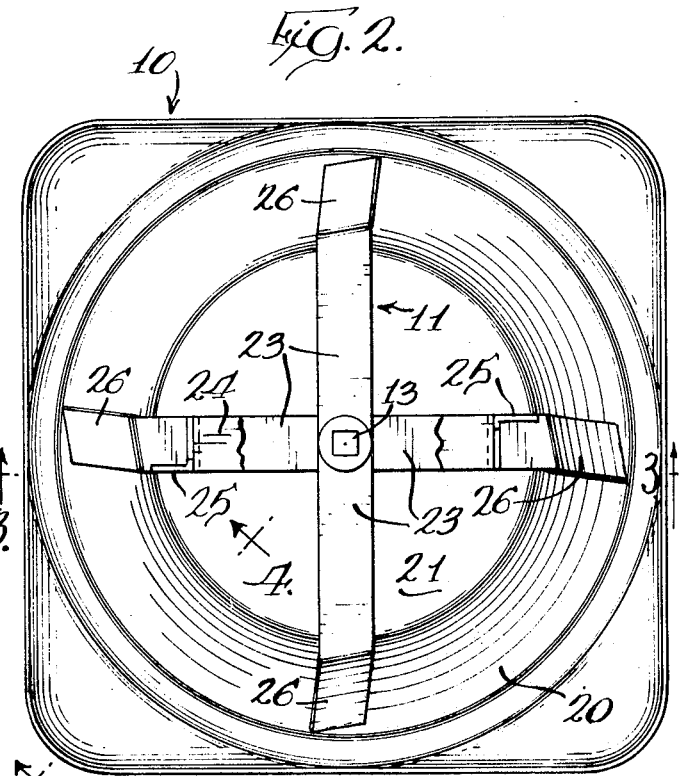
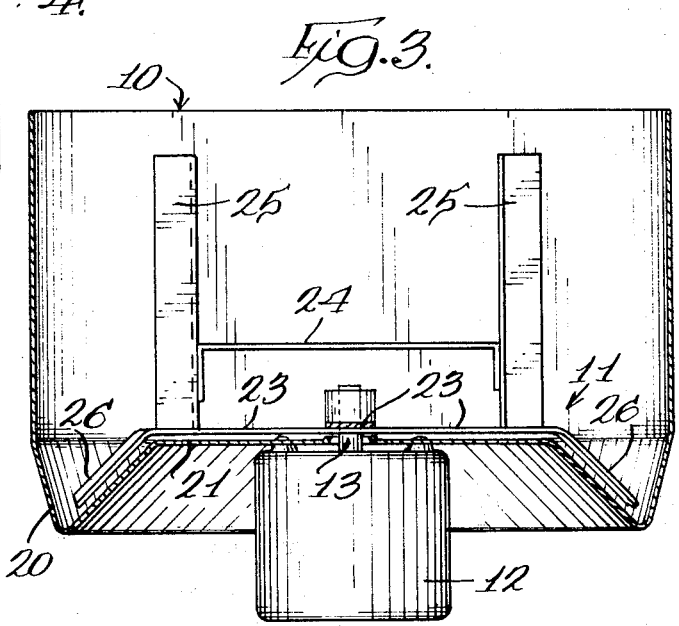
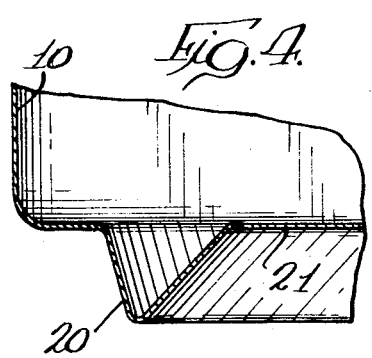
Inventor:
James M. Whalen
By Gary Parker,
Juettner, Pigott & Cullinan,
Attys

United States Patent Office

3,517,860
Patented June 30, 1970

3,517,860
ICE DISPENSER HAVING POLYGONAL WALLS
James M. Whalen, Glenview, Ill., assignor to Remcor Products Company, Chicago, Ill., a corporation of Illinois
Filed July 15, 1968, Ser. No. 744,838
Int. Cl. B65g 3/12
U.S. Cl. 222—202                                            5 Claims

ABSTRACT OF THE DISCLOSURE

An ice dispenser comprising a non-circular hopper portion for reception of a mass of small particles of ice, such as crushed, cracked, and flake ice, an impeller rotatable in the hopper for rotating the ice therein as a substantially unitary mass, and means for dispensing the ice from the lower portion of the hopper; the non-circular portion of the hopper alternately squeezing the rotating mass of ice inwardly and releasing it outwardly whereby the ice has tremor-like movements imparted to it both radially of and generally parallel to its axis of rotation to maintain it as a mass of free flowing discrete particles.

BACKGROUND OF THE INVENTION

Heretofore, much effort has been expended to provide various kinds of knives and blades in a hopper for particulate ice to prevent the ice from congealing or agglomerating and to maintain the ice particles in discrete free flowing form. In one type of dispenser, a rotating cutter equipped with knives or blades is supposed to slash its way through a stationary mass of small particles of ice to maintain them in discrete form. In another, the ice is rotated as a mass in a circular hopper and the hopper is equipped with vertical and radial knives or blades to slash through the rotating mass. In Pat. 3,393,839, the latter type of device has been equipped with stationary blades of such character as to impart undulating or tremor-like movements to the ice both vertically and radially to maintain the ice as individual free flowing particles.

SUMMARY OF INVENTION

I have discovered that a mass of small particles of ice can effectively be rotated in a non-circular, preferably polygonal hopper and that the side walls of such hopper, inasmuch as they undulate inwardly and outwardly relative to the axis of rotation of the mass of ice, alternately squeeze and release the mass thereby imparting tremor-like movements to the mass, both radially and vertically, to maintain the ice in the form of discrete particles, all without necessity for any blades, knives or other instrumentalities.

Consequently, I now provide a highly effective ice storing and dispensing hopper comprised simply of a non-circular hopper, a rotary impeller and a dispensing means.

THE DRAWINGS

FIG. 1 is an exploded perspective view of a preferred embodiment of my improved dispenser;
FIG. 2 is a plan view thereof on an enlarged scale;
FIG. 3 is a vertical section thereof taken substantially on line 3—3 of FIG. 2; and
FIG. 4 is a fragmentary vertical section of one corner of the dispenser taken substantially on line 4—4 of FIG. 2.

DESCRIPTION

In order to acquaint those skilled in the art with the manner of making and using my improved ice storing and dispensing means, I have illustrated in the accompanying drawings and will now describe a preferred embodiment presently contemplated by me as the best mode of carrying out my invention.

As shown in the drawings, an ice dispenser is conventionally comprised of a hopper or tank 10 for storing a large quantity of crushed, cracked or flake ice, such as 50 pounds, a rotary impeller 11 driven by an electric motor 12, and means 14 for accommodating controlled discharge of ice from the lower end portion of the hopper.

The means 14 may take the form of any of the dispensing means shown in Pats. 3,165,901; 3,211,338 and 3,217,509. However, I prefer and have illustrated dispensing means like that disclosed in Pat. 3,211,338 to which reference is made for a more detailed description. Briefly, such means comprises a vertically reciprocable gate 15 normally closing an ice discharge opening or hole 16 in the side wall of the hopper, a spring 17 normally biasing the gate closed position, and a solenoid (not shown) coupled by a lever 18 to the gate for opening the same. The solenoid is under the control of a switch (not shown) located at the discharge end of the means 14, which is adapted to be contacted by the glass or other receptacle to initiate operation of the solenoid and thus open the gate. It is preferable to provide an electrical control switch and timer means in the circuit of the solenoid to accommodate (a) holding the gate open for continuous dishharge of ice and (b) opening of the gate for a predetermined interval of time for discharge of a measured quantity of ice. The gate and the operating and the control means therefor are discribed in detail in Pat. 3,211,338.

The hopper 10 is essentially an open top tub the major part of which comprises a main upper hopper portion of non-circular, preferably polygonal cross section, such as the square section shown herein. The bottom of the tub is provided with a circular depression comprising an annular trough 20 with which the discharge opening 16 communicates. The opening 16 is preferably spaced a short distance above the bottom of the trough, and the trough is appropriately provided at its bottom with drain holes (not shown) so that only discrete particles of relatively Dry Ice will be discharged through the opening 16. The bottom of the tub is closed by an end wall 21 spaced above the trough, so that ice to be discharged will gravitate into and be confined within the trough.

The hopper may be made in any conventional manner, such as by deep drawing of sheet metal or the molding of plastics, and when completed is sheathed in insulation and provided with a removable insulated cover, all as is well known in the art.

The bottom wall 21 of the hopper is centrally apertured for upward, liquid sealed passage therethrough of the shaft 13 of the drive motor 12, which is suitably mounted on the wall 21 exteriorly of the hopper. The motor 12 may comprise an electric gear motor coupled in the circuit of the gate operating solenoid for operation at least conjointly with operation of the solenoid. Preferably, the aforesaid timer means is connected to the solenoid and the motor in such fashion, known in the art, that the motor is operated for a short interval of time before as well as during energization of the solenoid.

Mounted on the shaft 13 within the interior of the hopper is the impeller 11 which has a plurality of radial arms 23 that generally follow the contour of the circular part of the bottom wall of the hopper and upstanding projections or pushers 25 which serve to engage within the mass of ice placed in the hopper and to cause substantially the entirety of the mass to rotate with the impeller.

The pushers are preferably rigid strips of metal bent to V-cross section for strength and welded or otherwise secured to the upper surfaces of the arms 23. The pushers may be secured to the arms at the same radial spacing if desired, or may be set in radially staggered relation in order to gain a better purchase on the mass of ice. Two sets of pushers secured to opposite ones of the arms 23 and braced by a cross strap 24 have been found to be adequate to rotate the ice as a unitary mass even in the square tub illustrated herein.

Each arm 23 is provided at the outer end thereof with a diagonal portion 26 fitting within the annular trough 20 of the hopper and assisting in the above-described function. Also, the diagonal portions 26 insure a constant movement of ice through the trough and past the opening 16, whereby to maintain a positive discharge pressure on the ice at the outlet. The inclination of the outer wall of the trough of course assists in this function.

As will be appreciated from FIG. 2, the side walls of the polygonal part of the hopper include central portions which approach the axis of rotation of the impeller 11 and end or corner portions which are spaced substantially further outward from said axis. As shown for the preferred embodiment, the center of each of the four sides is substantially coplanar with the contiguous portion of the outer edge of the annular trough, and the four corners are spaced substantially outwardly from the trough. The end result relative to any given point on a rotating mass of ice is that the side walls of the hopper effectively undulate inwardly and outwardly of the axis of rotation of the mass. Thus, as any point on the mass approaches the center of one side wall, it is squeezed inwardly toward its axis by the wall, and since an entire segment of the mass is being so squeezed inwardly the particles are also squeezed or forced upwardly. Then, as that point passes the center of the one wall, the wall diverges away from the axis of the mass and opens up space for the ice to spread outwardly progressively to the next corner, during which time gravitational influence will cause that segment of the ice to spread outwardly and downwardly. Thereafter, as the segment of the rotating mass passes the corner, it is again squeezed inwardly and upwardly by virtue of the convergence of the side wall toward the axis of rotation.

To visual observation, the upper surface of the rotating mass of ice undulates in and out and up and down. The movements are presumably transmitted throughout the mass causing an internal tremor or eruption and a consequent shifting of each discrete particle of ice relative to its neighbors, whereby to render the entire mass free flowing. Thus, in one complete revolution of the mass within the square portion of the hopper, each segment of the mass of ice has eight tremor-like or undulating movements imparted to it, four each in the directions radially of and parallel to the axis of the impeller, whereby to break the mass into, or retain it in, the form of free flowing particles. Even after a mass of ice has been allowed to sit in the hopper for a substantial period of time, during which time thawing may have caused the mass to become congealed, a few moments of rotation of the mass will result in the mass being returned to the form of free flowing discrete particles. Cavitation does not occur within the interior of the mass and the particles of ice flow freely downward to take the place of ice removed from the hopper via the discharge opening 16. This result is assured by initiating operation of the impeller motor 12 for a short interval of time before the discharge gate 15 is opened, whereby to insure the presence at the gate of free flowing ice even if the dispenser has not been operated for a very long period of time.

It is thus seen that the present invention provides improved means for dispensing small pieces of ice, especially crushed, cracked and flake ice, in the form of free flowing discrete particles and does so in a convenient, economical and practical manner.

The manner in which the hopper is filled with ice is of little or no consequence to the present invention. The dispenser may be manually filled; it may be filled automatically from a primary reservoir; or it may be coupled with an icemaker as illustrated in earlier patents. Irrespective of the source of the ice, the dispenser positively discharges the ice as free flowing discrete particles. Likewise, the specific form of the dispensing means 14 is not critical.

Consequently, while I have shown and described what I regard to be the preferred embodiment of my invention, it is to be appreciated that various changes, rearrangements and modifications may be made therein without departing from the scope of the invention as defined by the appended claims.

I claim:

1. In an ice dispenser, a hopper for reception of a mass of small particles of ice, an impeller rotatable in said hopper for rotating the ice as a generally unitary mass within the hopper, said hopper including a portion of substantially polygonal cross section perpendicular to the axis of rotation of the impeller the side walls of which undulate inwardly and outwardly relative to the axis of rotation of said impeller and thereby impart tremor-like movements to the rotating mass of ice in directions both generally parallel to and radially of the axis of rotation of the impeller to maintain the ice as a free flowing mass of discrete particles, and dispensing means at the bottom of said hopper for controlling discharge of the discrete particles of ice.

2. In an ice dispenser as set forth in claim 1, said hopper comprising an upper portion of non-circular cross section and a lower portion of circular cross section communicating with said dispensing means, said impeller including blades within said circular portion adjacent said dispensing means for impelling ice through said dispensing means.

3. In an ice dispenser as set forth in claim 2, said circular lower portion of said hopper comprising an annular trough having inclined walls, said dispensing means being located on the outer inclined wall of said trough and said blades including diagonal portions extending into said trough in proximity to said dispensing means.

4. In an ice dispenser as set forth in claim 1, said hopper comprising a major portion of polygonal cross section.

5. In an ice dispenser as set forth in claim 1, said hopper comprising a main upper portion of generally square cross section and a lower trough like portion of annular cross section, said dispensing means being located on said trough like portion.

References Cited

UNITED STATES PATENTS

| 1,630,538 | 5/1927 | Micollef | 222—561 |
| 2,245,488 | 6/1941 | Marcuse | 222—233 |
| 2,601,943 | 7/1952 | Torrese | 222—233 X |
| 2,823,870 | 2/1958 | Davison | 241—92 |
| 2,839,250 | 6/1958 | Brockman et al. | 241—36 |
| 2,919,726 | 1/1960 | Zimmermann et al. | 222—190 X |
| 3,179,302 | 4/1965 | Murray | 222—233 |
| 3,179,314 | 4/1965 | Hodgson et al. | 222—561 |
| 3,028,998 | 4/1962 | Malik et al. | 222—185 X |

STANLEY H. TOLLBERG, Primary Examiner

N. L. STACK, JR., Assistant Examiner

U.S. Cl. X.R.
222—561; 241—188